(12) United States Patent
McKeehan et al.

(10) Patent No.: US 6,240,466 B1
(45) Date of Patent: May 29, 2001

(54) OBJECT-ORIENTED APPARATUS AND METHOD FOR DETERMINING NEW OBJECT LOCATION RELATIVE TO AN EXISTING OBJECT

(75) Inventors: Michael D. McKeehan; Steven J. Munroe; Erik E. Voldal, all of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/840,485

(22) Filed: Apr. 21, 1997

(51) Int. Cl.[7] ................................................. G06F 9/54
(52) U.S. Cl. ............................................................ 709/316
(58) Field of Search .............................. 395/680; 709/302, 709/303, 328, 315, 316

(56) References Cited

U.S. PATENT DOCUMENTS

| | | | |
|---|---|---|---|
| 5,379,423 | 1/1995 | Mutoh et al. | 707/204 |
| 5,459,860 * | 10/1995 | Burnett et al. | 707/101 |
| 5,475,817 | 12/1995 | Waldo et al. | 709/316 |
| 5,481,718 | 1/1996 | Ryu et al. | 709/316 |
| 5,535,134 | 7/1996 | Cohn et al. | 716/8 |
| 5,560,012 | 9/1996 | Ryu et al. | 717/1 |
| 5,566,302 | 10/1996 | Khalidi et al. | 709/312 |
| 5,577,251 | 11/1996 | Hamilton et al. | 709/101 |
| 5,590,327 | 12/1996 | Biliris et al. | 709/100 |
| 5,604,892 | 2/1997 | Nuttall et al. | 703/18 |
| 5,727,147 * | 3/1998 | Van Hoff | 709/200 |
| 5,761,513 * | 6/1998 | Yellin et al. | 717/5 |
| 5,787,438 * | 7/1998 | Cink et al. | 707/103 |

OTHER PUBLICATIONS unknown, SOMobjects Developer's Toolkit Programmer's Guide, vol. 1: SOM and DSOM, IBM corporation, pp. 91–95, 245–249, 272–275, and 302, Dec. 1996.* unknown, "The Component Object Model Specification Version 0.9", Microsoft Corporation, pp. 95–97, Oct. 1995.*

"Joint Object Services Submission: Life Cycle Services Specification", OMG TC Document 93.7.4, pp. 1–50, Jul. 1993.*

Standard ECMA–149, "Portable Common Tool Environment (PCTE)—Abstract Specification", vol. 1, 4th Edition, Dec. 1997.

* cited by examiner

*Primary Examiner*—St. John Courtenay, III
*Assistant Examiner*—Gary Scott Fourson
(74) *Attorney, Agent, or Firm*—Schmeiser, Olsen & Watts, LLP; Derek P. Martin (57) ABSTRACT

According to the present invention, an apparatus and method for creating new objects "near" existing objects is disclosed. In a preferred embodiment of the present invention, a desirable location for the new object is determined by making a series of observations and system level decisions. By examining the system parameters and creating new objects in physical locations where other, related objects currently reside, system performance in object-oriented systems can be greatly increased.

13 Claims, 4 Drawing Sheets

OBJECT-ORIENTED APPARATUS AND METHOD FOR DETERMINING NEW OBJECT LOCATION RELATIVE TO AN EXISTING OBJECT

BACKGROUND OF THE INVENTION

1. Technical Field

The present invention relates in general to the data processing field. More specifically, the present invention relates to the field of object-oriented programming techniques and mechanisms.

2. Background Art

The development of the EDVAC computer system of 1948 is often cited as the beginning of the computer era. Since that time, computer systems have evolved into extremely sophisticated devices. Modem computer systems contain relatively complex software that the computer hardware executes in order for the computer system to perform its intended functions. As the complexity of computer hardware and software increases, the need to efficiently and effectively develop new software becomes more acute. Software development costs have continued to rise because complex programs take more time, and hence more money, to produce. Object-oriented programming is one way computer programmers have sought to reduce the time and costs associated with developing complex software.

The goal of using object-oriented programming is to create small, reusable sections of program code known as objects that can be quickly and easily combined and re-used to create new programs. This is similar to the idea of using the same set of building blocks again and again to create many different structures. The modular and reusable aspects of objects will typically speed development of new programs, thereby reducing the costs associated with the development cycle. In addition, by creating and re-using a group of well-tested objects, a more stable, uniform, and consistent approach to developing new computer programs can be achieved.

Typically, object-oriented software programs or processes create and use objects to accomplish the required or desired goals of the application software. Most software processes will create an object or group of objects and then use those objects during the lifetime of that particular process. Whenever a new object is to be created in an object-oriented environment, the new object may be created in a location specified explicitly by the system designer. Alternatively, new objects may simply be created in a default physical memory location specified by the system. While this may work reasonably well for some systems and object-oriented processes, it may occasionally lead to some notable system performance and system security problems. Certain objects have an "object affinity" with other objects. This means that in a given system, certain objects tend to be used together and with each other. Therefore, if the objects can be created in the same physical location, the overall system will typically perform better.

The location of related objects becomes an even more important issue in distributed object systems. A distributed object system is a system that has two or more objects in different locations that may communicate with each other. These objects may be in processes running on two completely separate computer systems or may be in different processes running on the same computer system. If a first object, located on a given system (e.g. computer) needs to frequently reference a second object that is located on a different system which is located in a geographically remote location, communication time between the two objects can be greatly and unnecessarily increased because there is a certain amount of communication overhead in every system-to-system communication environment.

Another problem with having objects located on disparate systems is highlighted by examining computer system security concerns. In general, different computer systems will have very different security requirements and capabilities. For example, one computer system server may store data objects in a relational data base which is carefully secured by a system administrator. In this type of system, only certain users have access to the data objects in the data base. In a second system, the server may store data objects in a file system which is accessible to all users of the system. If two separate objects are located on these different systems, it will be necessary to navigate the intricacies of multiple security systems with varying access requirements. This additional overhead will typically increase processing time and decrease system performance. If, on the other hand, all of the objects were located in the same physical memory location, only one security system must be navigated to gain access to all of the objects.

Finally, without regard to system security restrictions, access and availability of system resources can vary greatly from system to system. Some systems and system resources are unavailable for certain periods of time due to system administration procedures and requirements. This means that certain objects located on remote systems may be unavailable to another system due to system level administration requirements such as backup or recovery procedures. The more systems involved in a given processing scenario, the more likely it is that one or more of the systems may be unavailable at any given moment. This may introduce unnecessary delays into the processing model because the first object may have to wait for the second object, which is located on a different system, to become available. If, on the other hand, both objects are located on the same system, then both objects will generally be available to each other at the same time.

Almost all object-oriented software applications will perform better if the objects that are used together are stored "near" each other. It the examples described above, where object affinity exists, it would generally be preferable to create a first object "near" the second object so as to allow more efficient communication. While the desirability of storing objects with object affinity in the same location may be demonstrated, there is presently no efficient or effective way of accomplishing this goal.

As both the complexity and the frequency of communication and transaction processing over networked computer systems increases, the need for better ways of creating and managing objects in object-oriented systems becomes more apparent and more acute. This is especially true as more and more computers are connected by networks such as the World Wide Web and share information across different computer systems. Without a mechanism for creating objects in a way that further reduces operational overhead and logistical performance problems, the computer industry will never fully realize the benefits of object-oriented programming environments.

DISCLOSURE OF INVENTION

According to the present invention, a method for creating new objects "near" existing objects is disclosed. In a preferred embodiment of the present invention, a desirable location for the new object is determined by making a series of observations and system level decisions. By examining the system parameters and creating new objects in physical locations where other, related objects currently reside, system performance in object-oriented systems can be greatly increased.

BEST MODE FOR CARRYING OUT THE INVENTION

The present invention relates to object-oriented programming techniques. For those individuals who are not generally familiar with object-oriented programming, the Overview section below presents many of the concepts that will help to understand the invention. Individuals skilled in the art of object-oriented programming technology may wish to skip the Overview section and proceed directly to the Detailed Description section of this specification.

1. Overview

Object-oriented Technology v. Procedural Technology

Object-oriented programming is a method of implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process that solves the problem; whereas, the focus of object-oriented design is on how the problem can be broken down into a set of autonomous entities that can work together to provide a solution. The autonomous entities of object-oriented technology are, of course, objects. Said another way, object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code that provide one or more services when requested by a client. Conceptually, an object has two parts, an external object interface and internal object data. In particular, all data is encapsulated by the object interface such that other objects must communicate with that object through its object interface. The only way to retrieve, process or otherwise operate on the encapsulated data is through the methods defined on the object. This protects the internal data portion of the object from outside tampering. Additionally, because outside objects have no access to the internal implementation of an object, that internal implementation can change without affecting other aspects of the program.

In this way, the object system isolates the requestor of services (client objects) from the providers of services (server objects) by a well defined encapsulating interface. Thus, in the classic object model, a client object sends request messages to server objects to perform any necessary or desired function. The message identifies a particular server object and specifies what method is to be performed by the server object, and also supplies any required parameters. The server object receives and interprets the message, and can then determine what service to perform.

Because all operations on an object are expressed as methods called from one object to another, methods can be called by objects in other processes. Objects that reside in one process and that are capable of calling methods on an object in another process (such as a process on a remote computer system) are known as distributed objects.

Many distributed object systems allow interaction between objects in remote locations over a communications link. In a distributed object system a "client object" in one location calls methods on a "server object" in another location, which may be a remote location. The client object-server object interactions form the basis for the distributed object system.

Another central concept in object-oriented programming is the class. A class is a template or prototype that defines a type of object. A class outlines the makeup of objects that belong to that class. By defining a class, objects can be created that belong to the class without having to rewrite the entire definition for each new object as it is created. This feature of object-oriented programming promotes the reusability of existing definitions and promotes efficient use of program code.

There are many computer languages that presently support object-oriented programming techniques. For example, Smalltalk, Object Pascal, C++ and Java are all examples of programming languages that support object-oriented programming to one degree or another.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications*, 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

2. Detailed Description

According to the present invention, an apparatus and method for creating new objects "near" existing objects is disclosed. In a preferred embodiment of the present invention, a desirable location for the new object is determined by making a series of observations and system level decisions. By examining the system parameters and creating new objects in physical locations where other, related objects currently reside, system performance in object-oriented systems can be greatly increased.

A preferred embodiment of the present invention defines a method for a object-oriented process to request that a new object be created "near" (i.e., in proximity to) an existing object. The request to create a new object near an existing object is treated as a request rather than an absolute requirement or directive because, in certain circumstances, it may not be possible to create a new object near the existing object. For example, in certain instances the class of the desired new object may not be allowed in the same address space as the existing object. Alternatively, the system may have certain security requirements which would not allow access for the purpose of creating new objects in certain memory locations.

The degree of nearness requested and allowed in a preferred embodiment of the present invention can be quite flexible. The granularity for the "nearness" of one object to another can be expressed in terms of the relative locations of any two objects. For example, one level of "nearness" might be characterized by locating two objects in the same physical computer hardware system. Another level of nearness can be described as the relationship between two objects which are located on the same server process. Alternatively, a different level of "nearness" is characterized by two objects which are stored in the same "container." A container is an abstraction for a physical memory storage area in a computer system. In addition, containers are used to manage the mapping of an object in volatile memory to its physical storage location in secondary storage.

When a system is initially configured, the containers for the system are configured with the tables and other storage necessary to run the system. The containers are allocated to provide the storage area for various classes used in a given system. In a system model, the containers would be analogous to tables in a relational database while in another model, the containers would be segments of memory. Yet another level of "nearness" can be described for two objects which are contained in the same data store, i.e. both objects are stored in the same relational data base table. Data stores may typically comprise multiple containers. Finally, the closest level of "nearness" can be obtained when the two objects are located on the same page or physical extent on a secondary storage device such as a hard disk.

One distinct advantage of the present invention can be illustrated by using an example of computer system memory usage in a distributed object system where interaction between objects is necessary. If two objects that must interact with each other are located in different memory locations which are not "near" each other, the computer system will employ a two-step process to provide for object interaction. First, the computer system must locate the first object and load it into main memory. After the first object is loaded into main memory, the system will locate the second object and load the second object into main memory. This two-step process is necessary because the two objects are not stored in the same memory space. If, on the other hand, both objects are stored in the same physical memory page or segment, then both objects can be loaded into main memory in a single operation. In addition to being faster, this approach will typically require less total system memory because less information is being swapped in and out of memory. In addition, if both objects are managed by the same server process, the total number of servers involved is reduced, which can reduce server resource overhead and reduce interprocess and network communication overhead because only one server process needs to perform server-related tasks.

In general, to implement the present invention, whenever a request to create a new object is received, the location of an existing object which exists in the desired location is obtained. The address location for the existing object is passed to the object-creating method as a parameter for nearness. The object-creating method is then capable of using the existing object's location to create the new object near the location of the existing object. By balancing the need to create new objects in certain locations against the system level parameters for creating new objects, the present invention allows a second object to be created within a predetermined proximity to an existing object.

Figure 1:
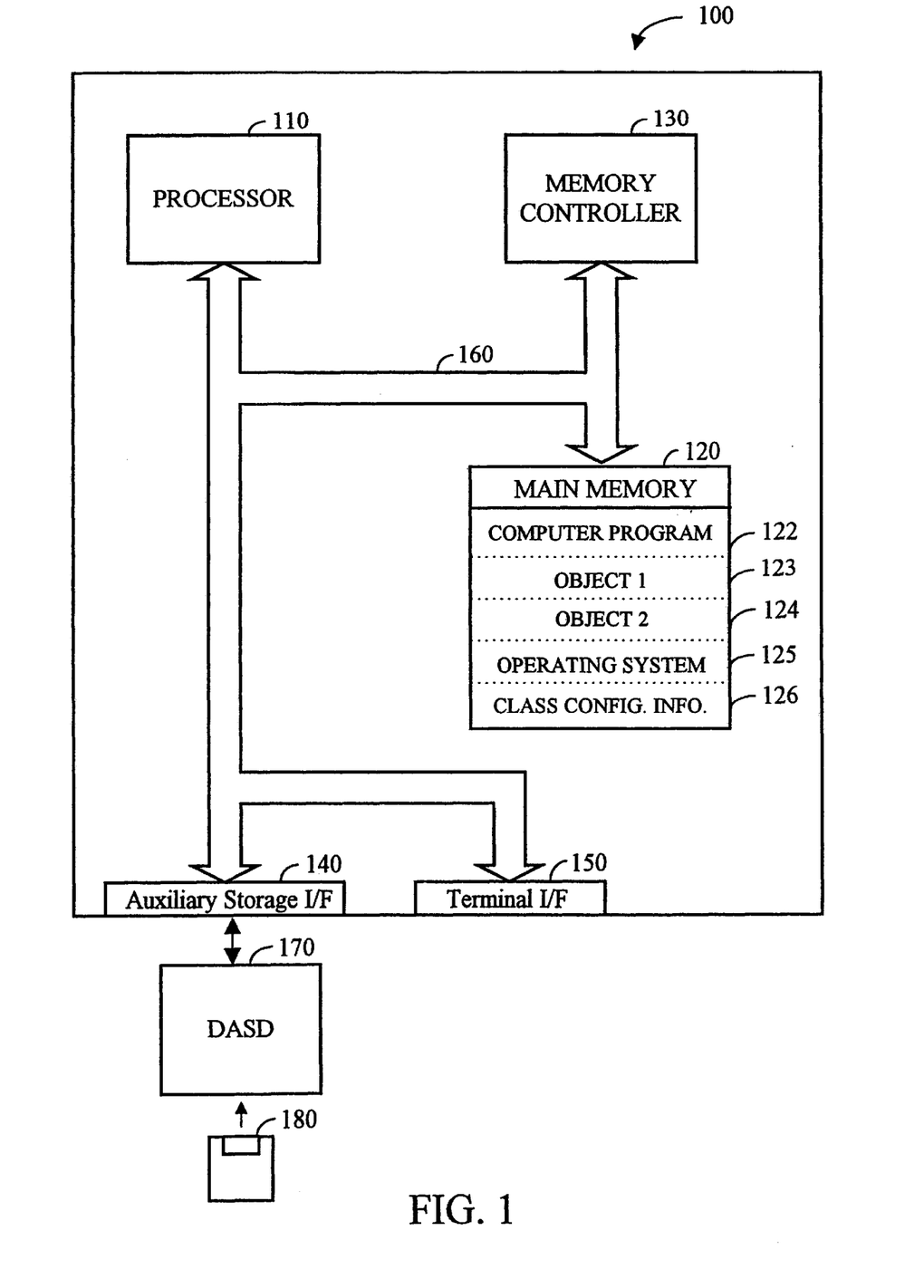
FIG. 1 is a block diagram of a system according to a preferred embodiment of the present invention.

Referring now to FIG. 1, a computer system 100 in accordance with the present invention is an enhanced IBM AS/400 mid-range computer system. However, those skilled in the art will appreciate that the methods and apparatus of the present invention apply equally to any computer system, regardless of whether the computer system is a complicated multi-user computing apparatus or a single user device such as a personal computer or workstation. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of computer system 100.

Processor 110 performs computation and control functions of computer system 100, and comprises a suitable central processing unit. Processor 110 may comprise a single integrated circuit, such as a microprocessor, or may comprise any suitable number of integrated circuit devices and/or circuit boards working in cooperation to accomplish the functions of a processor. Processor 110 suitably executes an object-oriented computer program 122 within main memory 120.

Auxiliary storage interface 140 allows computer system 100 to store and retrieve information from auxiliary storage devices, such as magnetic disk (e.g., hard disks or floppy diskettes) or optical storage devices (e.g., CD-ROM). One suitable storage device is a direct access storage device (DASD) 170. As shown in FIG. 1, DASD 170 may be a floppy disk drive which may read programs and data from a floppy disk 180. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g, disk 180) and CD ROMS, and transmission type media such as digital and analog communication links, including wireless communication links.

Memory controller 130, through use of a processor (not shown) separate from processor 10, is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main processor 110 and a single system bus 160, it should be understood that the present invention applies equally to computer systems having multiple processors and multiple system buses. Similarly, although the system bus 160 of the preferred embodiment is a typical hardwired, multidrop bus, any connection means that supports bi-directional communication in a computer-related environment could be used.

Main memory 120 suitably contains one or more computer programs 122, a first object 123, a second object 124, an operating system 125, and the class configuration information 126. Computer program 122 in memory 120 is used in its broadest sense, and includes any and all forms of computer programs, including source code, intermediate code, machine code, and any other representation of a computer program. Objects 123 and 124 are created and/or manipulated by some portion of computer program 122. In a preferred embodiment of the present invention, object 124 is specifically created near object 123 to take advantage of the increased efficiencies discussed above.

It should be understood that main memory 120 will not necessarily contain all parts of all mechanisms shown. For example, portions of computer program 122 and operating system 125 may be loaded into an instruction cache (not shown) for processor 110 to execute, while other files may well be stored on magnetic or optical disk storage devices (not shown). In addition, although computer program 122 is shown to reside in the same memory location as operating system 125, class configuration information 126 and objects 123 and 124, it is to be understood that main memory 120 may consist of disparate memory locations.

Figure 2:
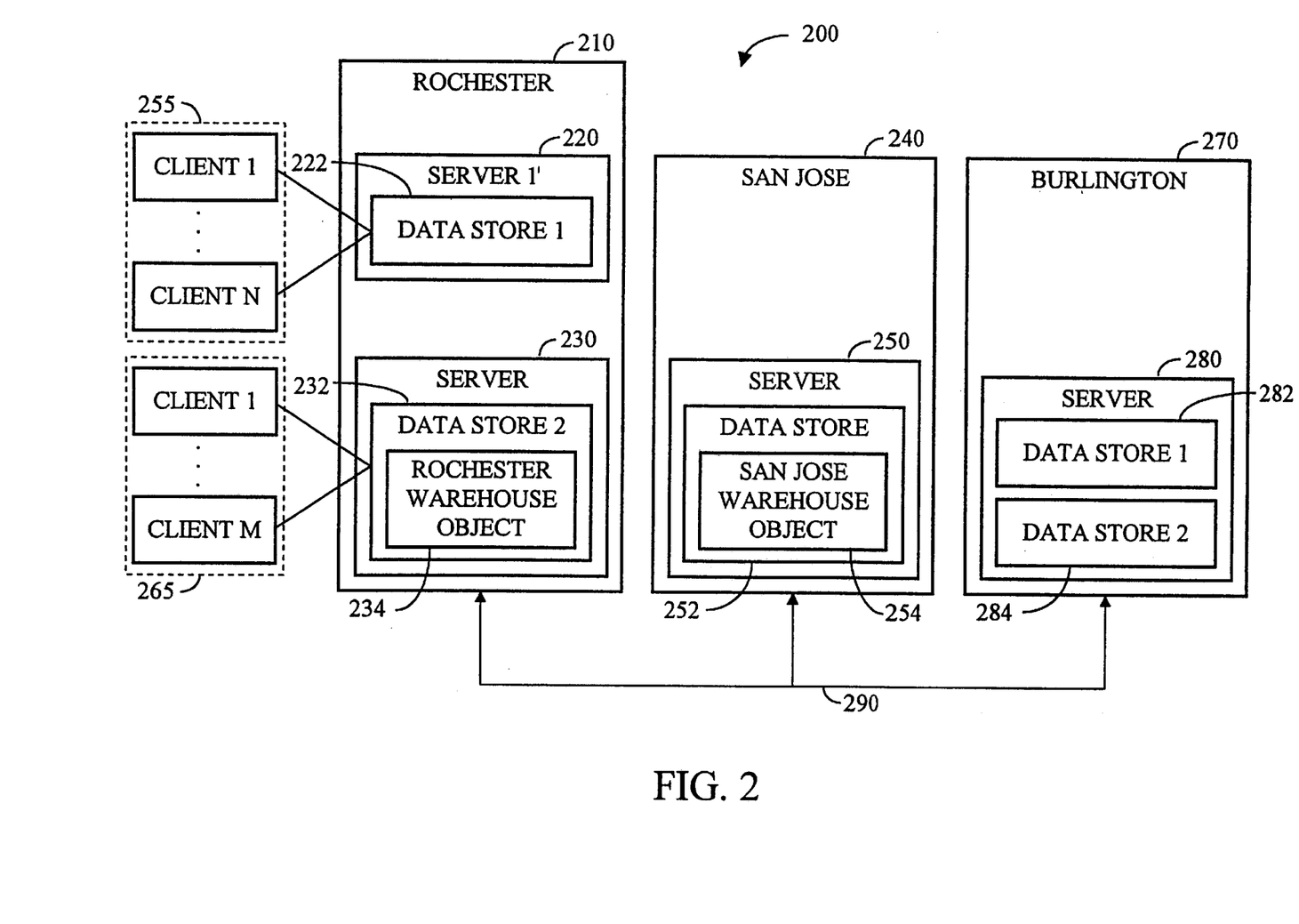
FIG. 2 is a block diagram of a system environment illustrating a preferred embodiment of the present invention.

Referring now to FIGS. 1 and 2, one application for the present invention can be illustrated by the following example of a system 200 designed to implement a computerized mail/order purchase/order fulfillment process. In system 200, there are three different warehouse systems, the Rochester Warehouse System 210, the San Jose Warehouse System 240, and the Burlington Warehouse System 270. Warehouse systems 210, 240, and 270 are all examples of specific instances of system 100 shown in FIG. 1. The three warehouse systems are connected by communication link 290, where communication link 290 is any type of connection capable of connecting computer systems and which is capable of supporting communication between various computer systems.

Rochester Warehouse System 210 includes the servers 220 and 230. Servers 220 and 230 are any typical computer system capable of performing server functions. Server 220 includes the data store 222 and server 230 includes the data store 232. Data store 232 includes Rochester warehouse object 234. Data stores 222 and 232 comprise multiple containers which represent physical memory storage locations used by servers 220 and 230 and by system 200 to store information related to processing customer orders for system 200.

San Jose Warehouse System 240 includes the server 250. Server 250 includes the data store 252 and data store 252 includes the San Jose Warehouse object 254. Data store 222 and 252 represents physical memory storage locations used by server 250 and system 200 to store information related to processing customer orders for system 200.

Burlington Warehouse System 270 includes the server 280. Server 280 includes the data stores 282 and 284. Data stores 282 and 284 represent physical memory storage locations used by server 280 and system 200 to store information related to processing customer orders for system 200. Each of the servers shown in conjunction with the warehouse systems in FIG. 2 may be running an object oriented program 122.

In a typical order processing system, certain informational items are necessarily related to a given customer order and naturally go together. These items generally include such things as a customer identification number, a customer shipping address and the individual order line items. For example, if an order were placed for a new computer system, the order would list the customer and the shipping address for that customer. For this particular order, the order line items might include a monitor, a hard drive, a keyboard, etc.

The central customer database object (not shown) for system 200 is typically controlled by system 200 and new customer objects will always be created in a specific location. However, many other objects may be created wherever system 200 decides it would be most advantageous. In system 200, because the customer database object is controlled, a new customer cannot be created near a given customer order. However, in this case, it is possible and desirable to create the individual order line item objects for a given order object near each order object that is created. That way, whenever the order object is retrieved, the individual order line item objects can be quickly retrieved and loaded into memory along with the order object.

In system 200, various order line objects are defined for all three warehouses and each warehouse is served by different servers. In addition, the various servers are connected via communication link 290, which creates a distributed server environment for the warehouses. In this distributed server environment, it is possible to create the order line objects near the warehouse where the order object was created.

For example, client 255 and client 265 are located at district sales offices and/or retail locations in the geographic vicinity of Rochester Warehouse System 210. Clients 255 and 265 most typically fill product orders from Rochester Warehouse System 210, which is assigned to their district. However, if the desired products are not available at Rochester Warehouse System 210, then orders placed by clients 255 and 265 may be filled from either San Jose Warehouse System 240 or Burlington Warehouse System 270. In addition, for a variety of reasons, delivery time from an alternative warehouse location may be faster or less expensive. That being the case, even though the order may be generated by client 255 or 265, the order and the associated order line objects should be created near the warehouse that will be filling the order. In the past, many systems which do not use the present invention would be designed so that the order line objects for clients 255 and 256 are always created on server 220 or server 230 because they are the servers associated with Rochester Warehouse System 210. By using the location of the order object to determine the location for the order line objects, the present invention will be more efficient than the previously used methods.

To create the order line objects near the order object, computer program 122 will use the new method "create_near( )." This is a method that operates on a factory class to create a new object. As a part of this procedure, there is a parameter which accepts the existing object location as a means of identifying the location where the new object should be created. Computer program 122 is not allowed to create a new order line object in any arbitrary location. Instead, the existing location of the order object is passed as a parameter to the create_near( ) method. This method instructs computer program 122 to create the order line object near the order object. If there is no near parameter specified, the location of the new object is a determined by the application or the class name for the object. For example, computer program 122 may create all objects of a given class in a certain location. The logic of the decision-making process used by computer program 122 for determining object location is shown in FIG. 3 below.

Figure 3:
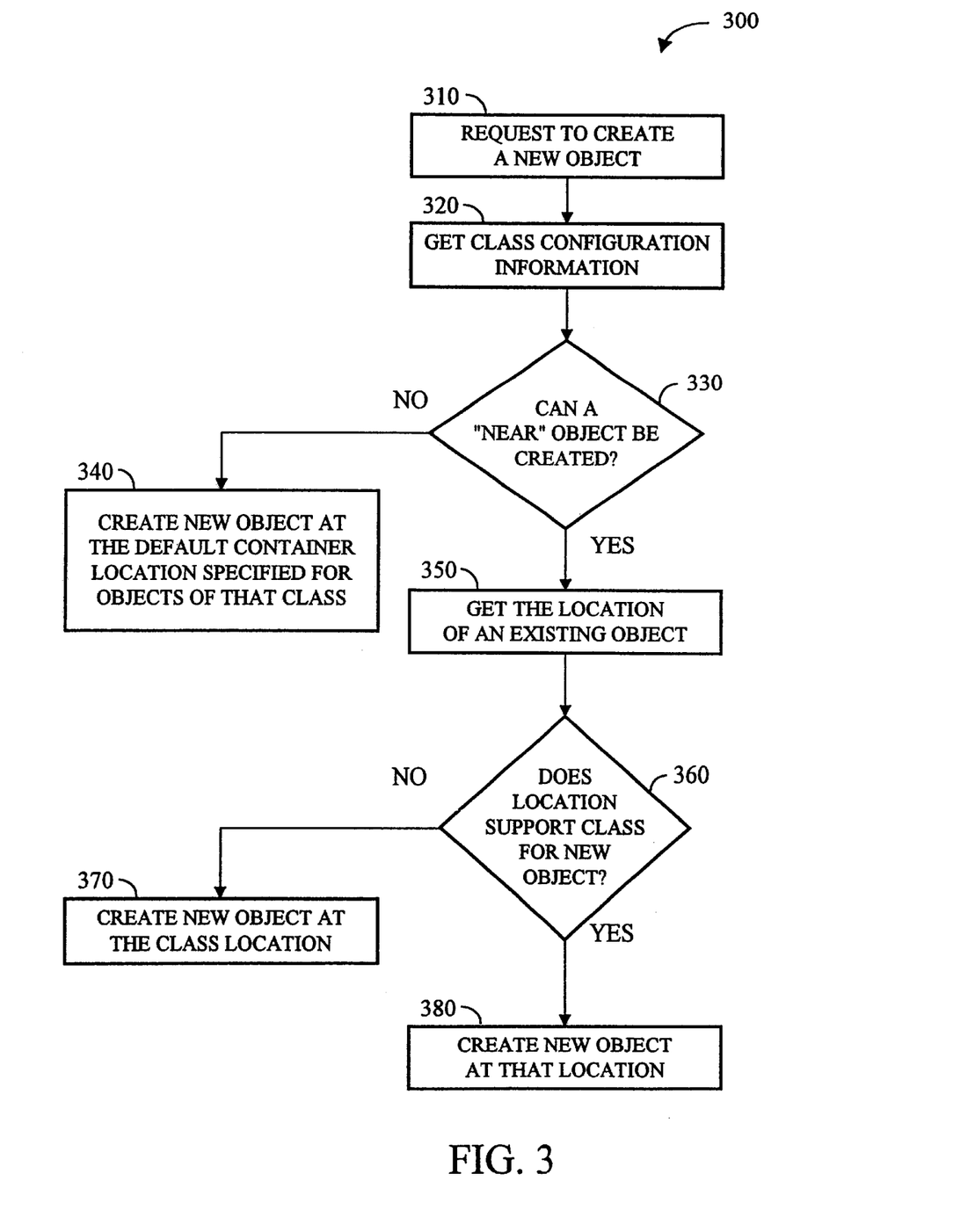
FIG. 3 is a flow diagram for a method in accordance with a preferred embodiment of the present invention for creating a new object near an existing object.

Referring now to FIGS. 1–3, a preferred embodiment of the method of the present invention includes the following steps: request to create a new object (step 310); get class configuration information (step 320); can a "near" object be created decision (step 330); create new object at the default container location for objects of that class (step 340); get the location of the existing object (step 350); does location support class for new object decision (step 360); create new object at the class location (step 370); and create new object at that location (step 380). These steps are performed by computer program 122.

Step 310 represents a request from a client or a process to create a new object in an object-oriented programming environment. In accordance with a preferred embodiment of the present invention, this step includes a request that the object be a "near" object, that is, if possible, the new object should be created near some existing object. The request may come from a client and is directed to computer program 122 which may be running on any one of the servers (220, 230, 250, 280) shown in FIG. 2.

In step 320, computer program 122 will retrieve and review class configuration information 126 for the class of the requested object. Class configuration information 126 will include details for configuration locations for various classes of objects to be used in step 330. Whenever a new object is to be created, class configuration information 126 will control whether or not a class location or container supports the object affinity concepts described in this invention disclosure. In addition, if any substitutions or alias names have been defined for any classes, this information will also be contained in class configuration information 126.

In step 330, the policy decision regarding creation of objects is taken into account. For example, there may be certain objects that are always created and stored in a given location. This may be the case with sensitive or secure information that is controlled by the system administrator. If the object affinity mechanisms described herein are not allowed to be used for a certain class of objects, then the default parameters will be used instead of the near provisions of the present invention. As shown in step 340, this means that new objects will be created in the default container location for objects of the specified class.

In step 350, the system will select an object that is known to be in the desired location. Typically, the system will have a domain-specific requirement for specific types of objects which are always created in a specific location. Knowing that these relationships exist, and knowing which existing object is desired, the location of an existing object can be used to determine the location for the new object so that the new object can be created in the same location as the existing object. Given a reference to one object, the operating system can locate the server and the container identification information for the requested object.

In step 360, once the desired location for the new object has been identified, the new object can be created. Computer program 122 will use class configuration information 126 for the desired location to determine if the desired location supports the new object class requirement. If so, the new object can be created in that location (step 380).

In step 370, if the new object cannot be created in the desired location because the desired location container does not support objects of the requested class, then the new object is created at the default location for those objects.

Finally, in step 380, if the new object can be created in the requested location near the existing object, then the system will create the new object near the existing object using the create_object( ) method. The create_object( ) method accepts the container location as a parameter and creates the requested new object in the specified container.

Figure 4:
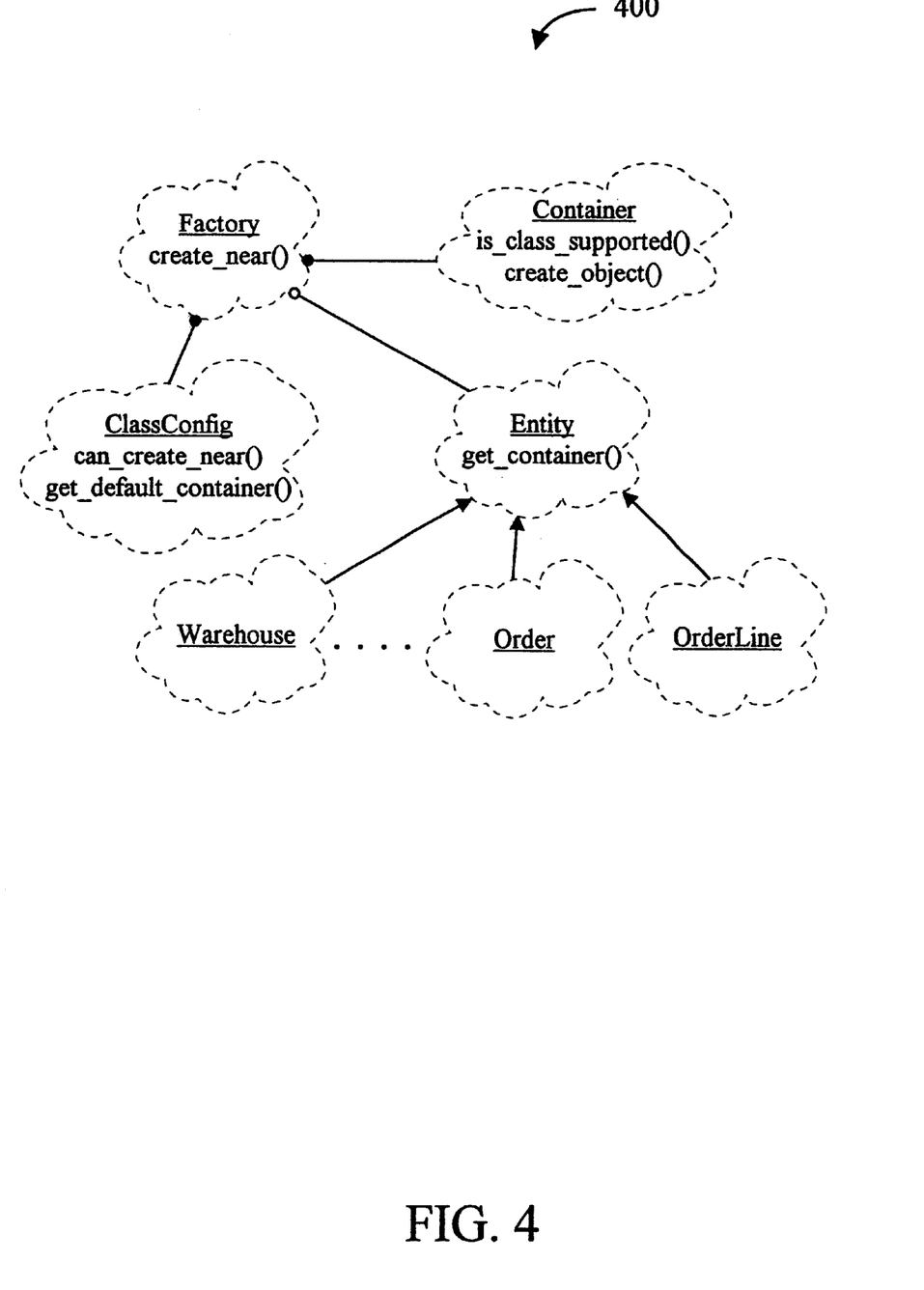
FIG. 4 is a class diagram including the methods of the present invention.

Referring now to FIGS. 1–4, the relationships between the classes and methods of the present invention are shown. It should be noted that the classes and methods shown in FIG. 4 are used to implement the method described above in the explanation of the steps of FIG. 3. In FIG. 4, the represented classes are: the Factory class; the Container class; the ClassConfig class; the Entity class; the Warehouse class; the Order class; and the OrderLine class. The methods of FIG. 4 are part of computer program 122 and are executed by processor 110.

Whenever a new object is required, an object instantiated under the Factory class receives a request to create the object (step 310). In accordance with a preferred embodiment of the present invention, that request may take the form of the create_near( ) method which also specifies that the new object be created near an existing object. In this case, the can_create_near( ) method on the Class_config class returns a boolean value to indicate whether or not a near object can be created according to the class configuration information (steps 320 and 330).

If the requested object is allowed to be created in the desired location, then the get_container( ) method on the Entity class will be used to return the container location for the existing object (step 350). If creation of the new object is not allowed in the requested location, then the default container location will be obtained by the get_default_container( ) method. The object is then created by using the create_object( ) method on the appropriate container (step 340).

Once the appropriate container location for the new object has been determined by using the get_container( ) method, the is_class_supported( ) method is used to determine if the desired container location will support an object of the appropriate class for the new object (step 360). The is_class_supported( ) method returns a boolean value to indicate whether or not the class of the requested object is supported in the desired container location. If so, then the requested object will be created in the requested location using the create_object( ) method (step 380). If the desired container does not support the class of the requested object, then the object will be created at the default location for objects of the appropriate class (step 370).

Therefore, in a preferred embodiment of the present invention, whenever a create_near( ) request is received, the system will attempt to create the new object as near as possible to other, existing objects with which the new object needs to interact. While it may not always be possible to create new objects in a specific desired location, by using the present invention wherever possible, the present invention will facilitate enhanced system performance by reducing unnecessary system overhead. In addition, the present invention will allow system designers to implement more efficient systems by invoking simple commands to create new objects near existing objects without spending a great deal of time in system analysis. In addition, as described above, the level of "nearness" may be adjusted to accommodate many different levels of granularity, or alternatively, many different specified levels of granularity may be combined to allow a wide range of desired creation locations and default creation locations.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. For example, while the examples given have been used in a distributed object environment, it is equally applicable to a single level store (SLS) model for an object-oriented environment to provide object creation in the same disk extent or same page as existing objects.

What is claimed is:

1. An apparatus comprising:

at least one processor;

a memory coupled to the at least one processor; and an object oriented factory object residing in the memory, the object oriented factory object including a method that is invoked to create a first object when an identifier to a second object is passed as a parameter while invoking the method, and in response to invoking the method while passing the second object identifier as a parameter, the object oriented factory object identifies a physical location of the second object, and creates the first object in a first location within a predetermined proximity to the second object if at least one predefined condition is satisfied, and creates the first object in a second location if the at least one predetermined condition is not satisfied.

2. The apparatus of claim 1 wherein the location of the first object and the second object is the same physical computer hardware system.

3. The apparatus of claim 1 wherein the location of the first object and the second object is the same server process.

4. The apparatus of claim 1 wherein the location of the first object and the second object is the same container.

5. The apparatus of claim 1 wherein the location of the first object and the second object is the same disk extent on a direct access storage device.

6. A program product comprising:

an object oriented class that defines a factory object that includes a method that is invoked to create a first object when an identifier to a second object is passed as a parameter while invoking the method, and in response to invoking the method while passing the second object identifier as a parameter, the factory object identifies a physical location of the second object, and creates the first object in a first location within a predetermined proximity to the second object if at least one predefined condition is satisfied, and creates the first object in a second location if the at least one predetermined condition is not satisfied; and signal bearing media bearing the object oriented class.

7. The program product of claim 6 wherein the signal bearing media comprises recordable media.

8. The program product of claim 6 wherein the signal bearing media comprises transmission media.

9. A method for creating a second object comprising the steps of:

invoking an object oriented method on a factory object while passing an identifier to a first existing object as a parameter;

the factory object determining a physical location of the first existing object;

the factory object creating the second object in a first location within a predetermined proximity in relation to the physical location of the first existing object if at least one predefined condition is satisfied; and the factory object creating the second object in a second location if the at least one predefined condition is not satisfied.

10. The method of claim 9 wherein the predetermined proximity is defined as the same physical computer hardware system.

11. The method of claim 9 wherein the predetermined proximity is defined as the same server process.

12. The method of claim 9 wherein the predetermined proximity is defined as the same container.

13. The method of claim 9 wherein the predetermined proximity is defined as the same disk extent on a direct access storage device.

* * * * *